US007541088B2

(12) United States Patent
Bennett et al.

(10) Patent No.: US 7,541,088 B2
(45) Date of Patent: *Jun. 2, 2009

(54) LASER-MARKABLE FILM

(75) Inventors: Cynthia Bennett, Alzey (DE); Holger Kliesch, Ginsheim-Gustavsburg (DE); Bodo Kuhmann, Runkel (DE); Martin Jesberger, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/859,809

(22) Filed: Sep. 24, 2007

(65) Prior Publication Data
US 2008/0076065 A1 Mar. 27, 2008

(30) Foreign Application Priority Data
Sep. 27, 2006 (DE) .............. 10 2006 045 495

(51) Int. Cl.
B32B 27/08 (2006.01)
B32B 27/18 (2006.01)
B32B 27/20 (2006.01)
B32B 27/36 (2006.01)

(52) U.S. Cl. .............. 428/216; 428/212; 428/213; 428/215; 428/323; 428/327; 428/328; 428/334; 428/335; 428/336; 428/337; 428/339; 428/402; 428/403; 428/407; 428/480; 428/910; 430/269; 430/346; 523/125; 524/495; 524/500

(58) Field of Classification Search .............. None
See application file for complete search history.

(56) References Cited

U.S. PATENT DOCUMENTS

| | | | |
|---|---|---|---|
| 6,127,475 A * | 10/2000 | Vollenberg et al. | 524/495 |
| 6,168,853 B1 * | 1/2001 | Feng et al. | 428/207 |
| 6,291,551 B1 * | 9/2001 | Kniess et al. | 523/216 |
| 6,376,577 B2 * | 4/2002 | Kniess et al. | 523/215 |
| 6,545,065 B2 * | 4/2003 | Solms et al. | 523/171 |
| 6,562,908 B2 * | 5/2003 | Zen et al. | 525/191 |
| 6,627,299 B1 * | 9/2003 | Feng et al. | 428/207 |
| 6,649,247 B2 * | 11/2003 | Murschall et al. | 428/141 |
| 6,693,657 B2 | 2/2004 | Carroll, Jr. et al. | |
| 6,723,259 B1 | 4/2004 | Groth et al. | |
| 6,841,222 B2 * | 1/2005 | Murschall et al. | 428/141 |
| 7,217,745 B2 * | 5/2007 | Edler | 523/171 |
| 2004/0132892 A1 * | 7/2004 | Kawakami et al. | 524/495 |
| 2005/0058939 A1 * | 3/2005 | Daga et al. | 430/270.1 |
| 2005/0066348 A1 * | 3/2005 | Limousin | 720/718 |
| 2005/0142371 A1 * | 6/2005 | Swain et al. | 428/516 |
| 2006/0141391 A1 * | 6/2006 | Klein et al. | 430/270.1 |
| 2006/0148968 A1 * | 7/2006 | Van Duijnhoven et al. | 524/500 |
| 2008/0107880 A1 * | 5/2008 | Kliesch et al. | 428/212 |

FOREIGN PATENT DOCUMENTS

| | | |
|---|---|---|
| DE | 195 22 397 A1 | 1/1997 |
| DE | 196 31 283 A1 | 2/1998 |
| EP | 0 198 771 A1 | 10/1986 |
| EP | 0 605 130 A1 | 7/1994 |
| EP | 0 866 750 A1 | 9/1998 |
| EP | 0 991 523 A1 | 4/2000 |
| EP | 1 125 967 A1 | 8/2001 |
| EP | 1 256 597 A2 | 11/2002 |
| EP | 1 458 574 | 9/2004 |
| JP | 02226470 A | 9/1990 |
| JP | 07-276575 * | 10/1995 |
| JP | 07276575 A | 10/1995 |
| JP | 02-273832 * | 9/2002 |
| JP | 2002-273832 * | 9/2002 |
| JP | 2002273832 A | 9/2002 |
| JP | 2004-206349 * | 7/2004 |
| WO | WO 01/19612 A1 | 3/2001 |
| WO | WO 03/018700 A1 | 3/2003 |
| WO | WO 2004/050766 A1 | 6/2004 |
| WO | WO 2004/050767 A1 | 6/2004 |
| WO | WO 2006042714 A1 | 4/2006 |

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*
"Distrupol Appointed Sole Distributor for DSM's SARLINK" press release (Jul. 19, 2002).*

* cited by examiner

*Primary Examiner*—Vivian Chen
(74) *Attorney, Agent, or Firm*—ProPat, L.L.C.

(57) ABSTRACT

The present invention is directed to a biaxially oriented, heat-set, at least two-layer coextruded film formed from polyethylene terephthalate (PET) or polyethylene 2,6-naphthalate (PEN) that optionally includes additional comonomer-derived units. The film includes a base layer and at least one outer layer. The base layer includes a white pigment and a laser absorber which has been coated with a carbonizing polymer.

22 Claims, No Drawings

LASER-MARKABLE FILM

CROSS-REFERENCE TO RELATED APPLICATIONS

This application claims priority to German Patent Application No. 10 2006 045 495.2 filed Sep. 27, 2006 which is hereby incorporated herein by reference in its entirety.

FIELD OF THE INVENTION

The invention relates to a stiff, readily processable, robust polyester film which is suitable for the production of identity cards, labels, and which can be marked by means of a laser permanently and in good quality with text, symbols or images. The markings are black or gray on a light background.

BACKGROUND OF THE INVENTION

Laser marking of plastics has been developed in the last few years in order to apply markings which are, for example, individual for the marked item, such as a serial number on an appliance or a photograph on an identity card, or else resistant to scratches or solvents. Markings in high quality are generally accomplished with pulsed laser units with the wavelengths 1064, 532 or 355 nm (Nd:YAG, Nd:YO$_4$ or FAYb), the focused laser beam being conducted over the polymer surface by means of swiveling mirrors. Some inscription tasks can, though, also be solved with pulsed or "continuous wave" CO$_2$ lasers in the wavelength range from 9.3 to 10.6 µm.

According to the polymer and formulation, it is possible to apply markings in various ways:
  gravure—low-contrast but permanent marking
  ablation—removal of a (possibly colored) top layer and uncovering of a different-colored underlayer; good contrasts, but no color or gray shades possible
  foaming—low contrast on light background, good contrasts possible with a dark background, gray shades not possible
  color change—color change in the material caused by chemical reactions, for example carbonization of the plastic caused by local heating. Variation of the beam power enables gray or color shades.

EP-A-0 866 750 describes laser-markable films for labels based on a white PET film which bears a black coating. Laser irradiation ablates the black coating and uncovers the white background. This structure enables good high-contrast white-on-black inscriptions and drawings. Since it is an ablation process, gray shades are not possible. In order to achieve a black-on-white inscription with this structure, the entire white surface would have to be scanned off with the laser, which is uneconomic and requires long periods in the course of irradiation by means of laser.

WO 03/18700 and U.S. Pat. No. 6,723,259 describe laser-markable labels which comprises a white layer and of a black layer. When the upper layer is white in color, a black-on-white inscription is possible with a short laser beam time. Owing to the ablation process, however, no gray shades are possible here either. The material used for the underlayer (electron beam-curable polyurethane acrylate) is brittle and has a low mechanical strength.

To achieve high-contrast markings with the possibility of gray shades (for example for photographs), the route through color change (carbonization) is required.

Compared to the few studies described above in the field of laser-markable coated films, there is a multitude of publications regarding laser-markable polymer molding materials. However, the patent literature and other literature contains contradictory statements regarding the necessity of specific "laser additives" for one plastic or another. This is presumably because particular additives which are regularly added to plastics for other purposes (for example as a filler, for coloring or for flame retardation) can also promote the laser marking result. The literature particularly frequently mentions polycarbonate, PBT and ABS as "laser-markable even without additive", but additives are often added even in the case of these polymers in order to improve the laser markability further.

In order to promote and to support the color change in polymer molding materials, various additives have been developed. As a result of the addition of an "absorber", a substance which absorbs the laser light and converts it to heat, the heat input and the carbonization can be improved. This is the case even for polymers such as polycarbonate which carbonize readily of their own accord. EP-A-0 198 771 describes the use of antimony metal or antimony oxide as an absorber. In JP-A-02-226470, carbonization is promoted by the absorber carbon black. In DE-A-199 61 304, coated graphite is used as an absorber for laser marking. DE-A-195 22 397 shows the use of mica (sheet silicate) coated with metal oxides as an absorber. Absorbers based on tin-antimony mixed oxides are described in U.S. Pat. No. 6,693,657. In WO 2006-42714, the dark coloration of plastics is obtained by the use of additives based on various phosphorus-containing mixed oxides of iron, copper, tin and/or antimony.

When a color change by carbonization is desired in a plastic which can be carbonized only moderately, if at all, an absorber can be combined with a readily carbonizing material, as proposed, for example, in EP-A-0 991 523. WO 2004/50766 and WO 2004/50767 disclose a laser marking additive with a particular structure, in which the absorber is present fixed in a core-shell structure with the readily carbonizing material.

Polyvinyl chloride films (PVC films) are frequently used in the production of cards, for example credit cards, which have to be individualized. Often, the cards are accordingly embossed with numbers and text, i.e. deformed thermoplastically, but this process is not suitable for every type of personalization. The processibility of the PVC films to cards is generally referred to as good provided that no laser marking is required. The thermally embossed individualization features can, however, be damaged in hot environments, for example in the interior of an automobile in the sun. There is therefore an interest in laser marking. However, laser marking of PVC films is problematic. The reason for this is that PVC decomposes at the high temperatures of several hundred degrees which occur in the course of laser irradiation in a zip reaction with release of gaseous, corrosive hydrochloric acid. The release of gaseous hydrochloric acid necessitates specific, particularly acid-resistant suction and filter apparatus for the laser marking, which are supplied, for example, by Bofa (Dorset, UK). Owing to the gas evolution and the associated material ablation, PVC is suitable only for gravure markings. In order to obtain good contrast, a printed-on colored lacquer layer is also ablated in the gravure process.

In addition to the difficulties in the laser marking, PVC cards break relatively frequently and often have to be replaced after a short time. A more robust laser-markable film material which does not release a corrosive gas in the course of laser processing would be advantageous.

Polycarbonate cards are much more robust than PVC cards and can be laser-marked very efficiently even with good gray shades owing to the low carbonizability, for example for the reproduction of photographs in identity cards and driving licenses. A disadvantage in the case of polycarbonate is the high material costs. Moreover, polycarbonate is not very stiff, since the polymer has a relatively low modulus of elasticity, which is manifested in a relatively low scratch resistance and relatively poor processability in card production.

Nor has there been any lack of attempts to find laser-markable alternative materials.

DE-A-196 31 283 and EP-A-1 458 574 describe laser-markable laminated cards which have core layers of ABS and outer layers of amorphous polyesters (PETG, PCTG) or acrylate. However, the use of amorphous, unoriented polyesters in the outer layer means that such cards are not very robust.

JP-A-07-276 575 and JP-A-2002-273 832 disclose laser-markable three-layer cards comprised of a PBT core layer and two PET outer layers by lamination by means of an adhesive or coextrusion. In both cases, the PBT layer comprises laser absorbers. Since at least the PBT layer and probably even all layers are unoriented, the stiffness is low. In the course of laser marking, the PET layer crystallizes, as a result of which the contrast is not optimal.

White-colored mono- or multilayer, biaxially oriented, heat-set PET films are known (see, for example, in EP-A-1 256 597 or EP-A-1 125 967) and are less expensive than polycarbonate films. Although these films have the desired stiffness and strength and are very suitable for the production of labels or cards, they are not sufficiently laser-markable. EP-A-0 605 130 describes coextruded polyester films which comprise a white-colored outer layer and a transparent outer layer. These films too have the desired stability and strength, but are not sufficiently laser-markable either.

SUMMARY OF ADVANTAGEOUS EMBODIMENTS OF THE INVENTION

It was an object of the present invention to provide films for use in identity cards, other cards or labels which no longer have the disadvantages of the prior art films and are notable especially in that dark symbols with good contrast can be obtained with an inscription laser, gray shades are possible in the course of marking, such that images (photographs) can be depicted, they have good stiffness, i.e. a modulus of elasticity of >3.5 GPa in longitudinal and transverse direction, and they are produced from a less expensive material than polycarbonate.

The object is achieved by a biaxially oriented, at least two-layer coextruded film comprised of polyethylene terephthalate (PET) or polyethylene 2,6-naphthalate (PEN), where the PET or PEN can contain additional comonomer-derived units differing from ethylene glycol and/or terephthalic acid or naphthalene-2,6-dicarboxylic acid, where the film encompasses a base layer and at least one outer layer, and where the base layer comprises a white pigment and a laser absorber which has been coated with a carbonizing polymer.

Even when a very effective laser marking additive had been used together with the white pigment, the results were at first not satisfactory because only moderate gray tones were achievable. It has been found that, surprisingly, only the combination of the laser marking additive with a white pigment and with a specific coextruded layer structure leads to success.

DETAILED DESCRIPTION OF ADVANTAGEOUS EMBODIMENTS OF THE INVENTION

The inventive coextruded polyethylene terephthalate or polyethylene naphthalate films have at least two layers. They comprise a white-colored marking layer B which is marked with the laser, and at least one transparent or translucent outer layer A, A' or C.

The outer layers (A, A' and C) are at least 3 μm, preferably at least 5 μm, more preferably at least 7 μm and most preferably at least 12 μm thick. The marking layer (B) has a minimum thickness of 7 μm, preferably 15 μm, more preferably 20 μm and most preferably 25 μm. The total thickness of the film is 23 μm to 1 mm, preferably 30 μm to 1 mm, more preferably 40 to 700 μm and most preferably 65 to 600 μm. The film may contain further layers.

In a preferred embodiment, the film has a three-layer structure, in which case the marking layer (B) bears outer layers (A, A' or C) on both sides. This embodiment is suitable for the laser marking of the self-supporting film. The outer layers may be the same or different. They may have the same formulation and thickness (ABA structure), the same formulation but different thickness (ABA' structure) or different formulation (ABC structure).

In a further preferred embodiment, the film comprises four layers, in which case the fourth layer D is applied on one of the outer layers in an ABAD, ABA'D or ABCD structure. In this embodiment, the matrix polymer of the layers A, A', B and C comprises polyethylene terephthalate or polyethylene naphthalate, and that of the layer D of an amorphous or low-melting polymer which is suitable for sealing to itself or to other items. This embodiment is suitable, for example, for the production of laser-markable bags, sealable lids or sheet metal lamination.

In a further embodiment, the film has two layers (AB structure). In this embodiment, the marking layer/reverse side B, before the laser marking operation, should be bonded in a fixed manner to another material, for example by melting onto sheet or metal or by laminating with an adhesive. The laser irradiation is effected through the outer layer A.

In a further embodiment, which is likewise intended for lamination on sheets, the film comprises three layers, ABD, where the layer D—as above—comprises an amorphous low-melting polymer which can serve for sealing to other items. In this embodiment, the minimum thickness of the marking layer B is preferably 60 μm and more preferably 75 μm.

Composition of the Layers

Matrix polymers of the layers A, A', B and C comprise mainly of polyethylene terephthalate (PET) or polyethylene 2,6-naphthalate (PEN). To adjust the properties, additional comonomers can be used to prepare the PET or PEN, preferably in an amount of up to 10 mol % (based on PET or PEN), but only with the prerequisite that the polymer remains crystallizable and has a melting point of >240° C. For example, the following comonomers are suitable:

a) aromatic mono- to bicyclic dicarboxylic acids such as isophthalic acid, 2,6-naphthalene-dicarboxylic acid (in PET), terephthalic acid (in PEN), b) aliphatic dicarboxylic acids having from 3 to 10 carbons atoms, c) linear or cyclic aliphatic diols having from 3 to 10 carbon atoms, especially 1,3-propanediol, 2-methyl-1,3-propanediol, 1,4-butanediol and 1,4-cyclohexanedimethanol, d) diethylene glycol and triethylene glycol.

Flexible comonomers such as long aliphatic diols or polyethylene glycols are less suitable because they change the mechanical properties to such an extent that the aim of a stiff film with a high modulus of elasticity cannot be met.

The matrix polymer of the layer D should be relatively low-melting or amorphous. It may, for example, be a PET or PEN which comprises relatively large amounts of the above-mentioned comonomers a) to d). Alternatively, it may be an aliphatic polyester or a partly transesterified blend of PET or PEN and an aliphatic polyester. The layer D may also be a completely different polymer or polymer mixture. It is essential merely that the layer D adheres to the rest of the film and has a lower melting point than the matrix polymer of layer B.

The matrix polymer of layer B comprises, as a white pigment, inorganic or organic particles in a concentration which is sufficient to obtain a light-colored, substantially opaque appearance in the biaxially oriented film. According to the particle type and size selected and appearance desired, the amount may vary from 1 to 30% by weight. The primary particle diameter ($d_{50}$) may vary from 0.01 to 5 µm. The inorganic particles used may be calcium carbonate, barium sulfate, apatite, precipitated or fumed silicas, titanium dioxide (anatase and rutile), aluminum oxide, zeolites and other silicates, for example aluminum silicate (alumina), particular preference being given to barium sulfate and titanium dioxide.

When organic particles are used in the layer B, they may be present in the form of crosslinked polymer particles, for example crosslinked polyacrylate or polystyrene particles. It is also possible to use a non-melting polymer powder with suitable particle size or one having a higher melting point than the matrix polymer. As a further alternative, it is possible to use an incompatible low-melting polymer, for example polyethylene, polypropylene, ethylene-norbornene copolymers (TOPAS® from Topas Advanced Polymers, Frankfurt-Hochst, Germany) or metathesis polymers of norbornene (ZEONEX® from Zeon Corporation, Tokyo, Japan).

The matrix polymer of the layer B also comprises a laser marking additive comprising an absorber in the wavelength range of the laser to be used, which has been coated with a readily carbonizing polymer. It is advantageous when this laser additive has a core-shell structure, in which case the readily carbonizing polymer (the core) is enveloped by a compatibilizing polymer (the shell) and core and shell are chemically bonded to one another. It is particularly advantageous when the core-shell additive is introduced into a further low-melting, shear-thinning (also referred to as "pseudoplastic") polymer which allows the additive to be distributed efficiently in the matrix polymer of the layer B. Such laser marking additives and their use in molding materials are described in WO 2004/50766 and WO 2004/50767 and are supplied commercially by DSM, the Netherlands, under the brand name MICABS®. It is advantageous when the readily carbonizing polymer is a polycarbonate, a polyamide or a polyester when the compatibilizing polymer is a polyethylene or polypropylene which has been modified with a maleic anhydride, and when the shear-thinning polymer is a polyethylene or polypropylene. It is likewise advantageous when the particle size of the absorber is in the range from 100 nm to 10 µm, and particularly advantageous when it is in the range from 500 nm to 2 µm.

The matrix polymers of the layers A, A', C, B and D may comprise inorganic particles which serve to make the film processable and windable and to establish the surface gloss. What is important is that the amount and type of the particles are selected and adjusted to the layer thickness such that the lasered text, symbols or images in the layer B remain readily visible. In principle, useful particles for this purpose are those from the group of calcium carbonate, barium sulfate, apatite, precipitated or fumed silicas, titanium dioxide (anatase or rutile), aluminum oxide, zeolites or other silicates, for example aluminum silicates (alumina), particular preference being given for these layers to silicon dioxide particles owing to their good binding into the matrix.

When none of the outer matrix layers comprises inorganic particles, it is advantageous when the film bears a particle-containing coating for the purpose of better slipability and windability.

To adjust the color or to obtain a colored film, dyes, chromatic pigments or optical brighteners may be present in the layers A, A', B, C or D. Further additives, for example dispersing assistants for particles, oxidation stabilizers, UV absorbers or flame retardants, may likewise be present.

Process

The polyester matrix polymers of layers A to C are prepared by polycondensation, either proceeding from dicarboxylic acids and ethylene glycol (so-called "PTA process") or else proceeding from the esters of the dicarboxylic acids, preferably the dimethyl esters, and ethylene glycol (so-called "DMT process"). Usable polyethylene terephthalates have SV values in the range from 600 to 900, and polyethylene 2,6-naphthalates values of from approx. 500 to 800.

When layer D is a polyester, it is generally prepared in an analogous manner.

The white pigments, inorganic particles or crosslinked organic particles of layers A, A', B, C and D may be added as early as in the course of preparation of the polyester. To this end, the particles are dispersed in ethylene glycol, optionally ground, decanted, etc., and added to the reactor either in the (trans)-esterification or polycondensation step. Alternatively, a concentrated particle-containing or additive-containing polyester masterbatch can be prepared with a twin-screw extruder and can be diluted with particle-free polyester in the course of film extrusion. A further possibility comprises adding particles and additives directly in the course of film extrusion in a twin-screw extruder.

Uncrosslinked organic particles are either processed to a masterbatch in a twin-screw extruder or added directly in the course of film extrusion.

When the laser marking additive is low-melting, it can be added in a single-screw extruder only in small, possibly insufficient amounts without disrupting the delivery. If a single-screw extruder is to be used for the layer B, it is advantageous to prepare a mixture of the laser marking additive and of the polyester matrix beforehand in a twin-screw extruder. Such a mixture has the polyester as the matrix phase and can be dried and extruded without any problem without conglutinating. In the case of a twin-screw or multiscrew extruder for the layer B, the laser marking additive can be added directly in the course of film extrusion.

When single-screw extruders are used, it has been found to be advantageous to dry the polyesters beforehand. In the case of use of a twin-screw extruder with a venting zone, it is possible to dispense with the drying step.

The polymer or the polymer mixture of the individual layers is first compressed and liquefied in an extruder. The melts are then shaped in a multilayer nozzle to flat melt films, layered one on top of another, forced through a slot die and drawn off on a chill roll and one or more draw rolls, in the course of which they cool and solidify.

The inventive film is oriented biaxially, i.e. stretched biaxially. The biaxial stretching of the film is most frequently performed sequentially. In this case, preference is given to stretching first in longitudinal direction (i.e. in machine direction=MD) and then in transverse direction (i.e. at right angles to machine direction=TD). The stretching in longitudinal direction can be performed with the aid of two rolls running at different speeds according to the desired stretching ratio. For the transverse stretching, a corresponding tenter frame is generally utilized.

Instead of the sequential stretching, simultaneous stretching of the film is also possible but not necessary.

The temperature at which the stretching is performed can vary within a relatively wide range and is guided by the desired properties of the film. In general, the stretching in longitudinal direction is performed in a temperature range from 80 to 130° C. (heating temperatures from 80 to 130° C.) and in transverse direction in a temperature range from 90 (beginning of the stretching) to 140° C. (end of the stretching). The longitudinal stretching ratio is generally in the range from 2.0:1 to 5.5:1, preferably from 2.2:1 to 5.0:1. The transverse stretching ratio is generally in the range from 2.4:1 to 5.0:1, preferably from 2.6:1 to 4.5:1.

Before the transverse stretching, one or both surface(s) of the film can be coated in-line by processes known per se. The in-line coating can lead, for example, to improved adhesion between a metal layer or a printing ink and the film, to an improvement in the antistatic performance or in the processing performance of the film. When the outer coextruded layers do not have any inorganic particles for improving the slippage and winding characteristics, it is possible at this point to apply a particle-containing coating.

In the subsequent heat-setting, the film is kept at a temperature of from 150 to 250° C. under mechanical stress over a period of from about 0.1 to 10 s. Subsequently, the film is wound up in a customary manner.

Properties and Advantages of the Inventive Film

The inventive film is notable for excellent laser markability with lasers in the wavelength range from 157 nm to 10.6 μm, especially with $CO_2$ lasers (10.6 μm), Nd:YAG lasers (1064, 532, 355, 266 nm), Nd:$YO_4$ lasers (1064, 532, 355 nm) and so-called fiber lasers ("FAYb"; approx. 1060 nm).

This good result is achieved through the combination of the three features of the invention in the biaxially oriented polyester film: specific layer structure (laser-markable base layer (B), transparent outer layer (A)), the use of a specific laser marking additive together with a white pigment in the layer B. In the case of a different layer structure, specifically without the outer layer A, dark markings are not obtained, but rather only light gray markings, in which case an increase in the laser output does not lead to a darker color but rather merely to the film being burnt through. When, instead of the inventive laser marking additive (laser absorber with slightly carbonizing coating), a simple commercially available laser absorber is used, likewise only light gray markings are obtained. When the inventive laser marking additive is used but the white pigmentation of the layer B is omitted, almost no marking of the translucent film takes place.

In contrast to the white PET film with the laser-ablatable black coating according to EP-A-0 866 750, the inventive film enables black-on-white inscriptions within short irradiation times and gray shade depictions for photographs.

In contrast to laser-ablatable labels comprising a black layer and a white layer according to WO 03/18700 and U.S. Pat. No. 6,723,259, the inventive film is significantly stiffer and enables images such as photographs to be depicted by means of gray shade graduation. Furthermore, electron beam instruments are not required in the case of the inventive film.

Compared to the two ablatable materials, the inventive film has the further advantage that the laser inscription is not on the film surface but is instead present in the covered layer B. The marking is thus permanent, forgeryproof and cannot be scratched off.

Compared to the PVC films which have been equipped with laser absorbers and are frequently used for cards, the inventive film is significantly more thermally stable, which is to the benefit of the long life of the cards in connection with environmental influences (for example heat evolution in parked automobiles). This is also true of PVC replacements such as PETG. In the laser marking of the inventive film, no corrosive gas harmful to health is evolved.

Compared to the polycarbonate films which are equipped with or without laser absorbers and are likewise frequently used for cards, the inventive film is significantly stiffer. Since the flexural stiffness of a material is proportional to the modulus of tensile elasticity, the inventive film, with the same thickness, has an approx. 60% higher flexural stiffness compared to a polycarbonate film (modulus of elasticity approx. 4 GPa vs. <2.5 GPa for polycarbonate). Moreover, PET is less expensive than polycarbonate.

Uses

The inventive film is very suitable for use in identity cards and other high-value cards, the individual labeling of long-life goods which may have to survive hostile environmental conditions (for example electronic parts, means of transport, air and space travel, industrial units, medical systems, etc.). When the inventive films are used, for example, in steel sheet lamination instead of lacquer, they offer excellent and high-resistance corrosion protection combined with laser inscribability and an attractive appearance.

Test Methods:

To characterize the raw materials and the films, in the context of the present invention, the following test methods were utilized:

Measurement of the Mean Particle Diameter $d_{50}$

The determination of the mean diameter $d_{50}$ is performed by means of a laser on a Horiba LA 500 by means of laser diffraction (other test instruments are, for example, Malvern Master Sizer or Sympathec Helos, which use the same measurement principle). To this end, the samples are introduced into a cuvette with water and the cuvette is then placed in the test instrument. The dispersion is scanned by means of a laser and the particle size distribution is determined from the signal by comparison with a calibration curve. The particle size distribution is characterized by two parameters, the median value $d_{50}$ (=measure of the position of the mean) and the scatter, the so-called SPAN98 (=measure of the scatter of the particle diameter). The measurement operation is automatic and also includes the mathematical determination of the $d_{50}$ value. By definition, the $d_{50}$ value is determined from the (relative) cumulative curve of the particle size distribution: the point of intersection of the 50% ordinate value with the cumulative curve affords the desired $d_{50}$ value on the abscissa axis.

Primary Particle Size of Nanoparticles (AEROSIL® and NYACOL®)

The mean size of the primary particles is determined using transmission electron micrographs (TEMs) of the product to be analyzed. When the sample is present in the form of a film or polymer granule, the TEM analysis should be performed on microtome sections.

Mechanical Properties

The mechanical properties are determined by means of tensile testing based on DIN EN ISO 572-1 and -3 on 100 mm×15 mm film strips. The change in length is measured by means of a traversed distance recorder. The modulus of elasticity is determined at a test speed of 10%/min as the slope between 0.2 and 0.3 expansion. The σ5 value (force at 5% expansion) is measured at a test speed of 100%/min.

SV Value (Standard Viscosity)

The standard viscosity SV (DCA) is, based on DIN 53 726, measured at a concentration of 1% in dichloroacetic acid. The dimensionless SV value is determined from the relative viscosity ($\eta_{rel}$) as follows:

$$SV = (\eta_{rel} - 1) \times 1000.$$

The intrinsic viscosity (IV) correlates with the standard viscosity as follows $$IV = [\eta] = 6.907 \cdot 10^{-4} \, SV \, (DCA) + 0.063096 \, [dl/g]$$

Laser Markability

A VECTORMARK® VMc5 Nd:YO$_4$ inscription laser from Trumpf in Schramberg (1064 nm) was used to write test patterns onto the films with the following parameters:

Power (P): from 10 to 60% in 10% steps

Frequency: from 10 to 60 kHz in 10 kHz steps

Speed: 1200 mm/s

Almost all samples are markable more or less efficiently under these conditions. For each sample, the grid field which is the best with regard to darkness and uniformity of the marking without having holes burnt through is selected. For each sample, the best field thus determined is then rated visually according to the criteria of color and surface quality. The marks 5 and A are the best and from 0 to 2 and D are unsatisfactory. A roughened surface (marks B and C) might be good for some applications; for others, it will be undesired.

| Mark | Color | Mark | Surface |
|---|---|---|---|
| 5 | Black | A | smooth, continuous |
| 4 | dark gray | B | slightly roughened |
| 3 | mid gray | C | significantly roughened |
| 2 | light gray | D | great loss of thickness through ablation |
| 1 | very light gray | | |
| 0 | no darkening | | |

In addition, in some examples, gray shade images of photographs were marked with the VECTORMARK® VMc5 Nd:YVO$_4$ laser.

In some examples, further marking tests with two other lasers were investigated:

1. A frequency doubled Nd:YAG laser (532 nm) from Rofin-Sinar Laser GmbH in Bergkirchen, model: PowerLine 20E SHG II,
2. Nd:YAG laser (1064 nm) from Trumpf in Schramberg, VECTORMARK® VMc3.

Layer Thicknesses

The film is embedded into a molding material and cut through with a microtome, and the surface is etched with argon plasma and the cut edge is viewed in a scanning electron microscope. As a result of the different pigmentation of the layers, the layer thicknesses can readily be distinguished from one another and measured.

Gloss

The gloss of the film is determined to DIN 67530. The reflector value is measured as the optical parameter for the surface of a film. Based on the standards ASTM-D 523-78 and ISO 2813, the angle of incidence is set to 60°. At the angle of incidence set, a light beam hits the flat test surface and is reflected or scattered by it. The light beams incident on the photoelectronic detector are indicated as a proportional electrical parameter. The measurement is dimensionless and has to be reported with the angle of incidence.

EXAMPLES

In the examples which follow, the following feedstocks were used in the form of PET masterbatches, which were diluted to the desired concentration with PET in the extruder:

As particles for slippage and white coloration:

Barium sulfate, BLANC-FIXE® XR HX from Sachtleben, Duisburg, Germany, $d_{50}$: 0.55 μm Colloidal silicon dioxide, NYACOL® DP5540 from Nyacol, Ashland, Mass., USA, mean size of the primary particle: 100 nm, barely agglomerated Fumed silica, AEROSIL® TT600 from Degussa, Hanau, Germany, mean size of the primary particle: 40 nm, agglomerated to particles with a $d_{50}$ of approx. 0.2 μm Coarse silicon dioxide particles, SYLYSIA® 430 from Fuji Sylysia, Japan, $d_{50}$: 4.8 μm Synthetic (precipitated) silicon dioxide, SYLOBLOC® 44 H from Grace, Worms, Germany, $d_{50}$: 2.5 μm Titanium dioxide, rutile, $d_{50}$: 0.3 μm as laser additives:

LAZERFLAIR® 825, absorber for laser marking from Merck, Darmstadt, Germany (coated sheet silicate, see DE-A-195 22 397 and other patent applications from Merck)

MARK-IT®, absorber for laser marking from Engelhard, Iselin, N.J., USA (antimony-doped tin oxide; see, for example, U.S. Pat. No. 6,693,657 and other patents from Engelhard)

MICABS® A204 and A206, additives for laser marking from DSM, Geleen, the Netherlands, to WO 2004/50766 and WO 2004/50767

Phosphorus-containing tin-copper mixed oxide (see, for example, WO 2006-42714)

Example 1

Inventive

Three polymer mixtures were melted in 3 extruders at 285° C.:

1. 99.73% by weight of polyethylene terephthalate with an SV value of 800, 0.12% by weight of synthetic SiO$_2$ and 0.15% by weight of fumed SiO$_2$→layer A
2. 93.5% by weight of polyethylene terephthalate with an SV value of 800, 3.5% by weight of titanium dioxide and 3% by weight of the laser marking additive MICABS® A204→layer B
3. 99.73% by weight of polyethylene terephthalate with an SV value of 800, 1.0% by weight of synthetic SiO$_2$ and 0.15% by weight of fumed SiO$_2$→2nd A layer The polymer mixtures were combined in an adapter and applied electrostatically to a chill roll heated to 60° C. through a slot die. Subsequently, they were stretched longitudinally and then transversely under the following conditions:

| | | | |
|---|---|---|---|
| Longitudinal stretching | Heating temperature | 75-115 | °C. |
| | Stretching temperature | 115 | °C. |
| | Longitudinal stretching ratio | 4.0 | |
| Transverse stretching | Heating temperature | 100 | °C. |
| | Stretching temperature | 135 | °C. |
| | Transverse stretching ratio | 4.0 | |
| Heat Setting | Temperature | 230 | °C. |
| | Time | 3 | s |

The film thus obtained had a total thickness of 50 µm, and the outer layers A were both 7 µm thick. The structure of the film, the properties and the laser marking result of the film can be taken from Tables 1a and 2.

In addition to the marking experiment at 1064 nm included in Table 2, a marking experiment was performed at 532 nm (frequency-doubled Nd:YAG laser). At a marking speed of 1000 mm/s, the best marking result was obtained at the setting of 50 kHz and 27 Å. The color mark was 4. It was possible to mark passport photographs on the film with a good gray shade profile at 500 dpi (dots per inch).

Examples 2 to 8

Inventive

In a similar manner to that in Example 1, further films were produced, while the layer thicknesses and type and amount of the particles and the laser additive were varied. The composition and the properties are likewise compiled in Table 1a and 2.

In addition to the marking experiments included in Table 2, in Example 5 and 8, the Nd:YO$_4$ laser was used to mark photographs on the films. Here too, it was possible to achieve a good gray shade profile.

Example 9

Inventive

In a similar manner to that in Example 1, a film was produced, but with the difference that it had only 2 layers. The composition and layer thicknesses are listed in Table 1a. As shown in Table 2, it was possible to achieve good marking results, but the marked points remained adhering to the substrate because the reverse side of the film had melted.

Example 10

Inventive

A film with a similar structure to Example 5 was produced, with the difference that a further layer D which comprised PET modified with 20 mol % of isophthalic acid had been applied to the A' layer. The layer D was 5 µm thick. It was possible to laminate the film onto ECCS steel at 180° C. with the D layer facing the sheet. The laser marking results of the steel sheet thus coated were as in example 5.

Example 11

Inventive

A film with a similar structure to example 5 was produced with the difference that the layer B was 65 µm thick and, instead of the A' layer, a different composition was used (C layer), which comprised PET modified with 20 mol % of isophthalic acid. It was possible to laminate the film onto ECCS steel at 180° C. with the D layer facing the sheet. The laser marking results of the steel sheet thus coated were as in example 5.

Comparative Examples C-1 to C-7

Films were produced in a similar manner to that in Examples 1 to 11, except that significant changes in the composition were made. The composition and the layer structure of the films are listed in Table 1b. The properties and laser marking results are compiled in Table 2.

Comparative Examples C-8

The modulus of elasticity and σ5 value of a commercial polycarbonate film intended for laser marking, MACROFOL® ID 6-2 laserable, were measured:

Modulus of elasticity: 2.3 GPa σ5 value: 58 MPa

TABLE 1a

Structure and Formulation of the Inventive Examples

| Example | First layer (A) Formulation | Thickness µm | Second layer (B) Formulation | Thickness µm | Third layer (A, A' or C) Formulation | Thickness µm | Appearance |
|---|---|---|---|---|---|---|---|
| 1 | PET with 0.12% synthetic and 0.15% fumed SiO$_2$ | 7 | PET with 3.5% TiO$_2$ and 3% MICABS ® A204 | 36 | PET with 0.12% synthetic and 0.15% fumed SiO$_2$ | 7 | white, shiny |
| 2 | PET with 0.12% synthetic and 0.15% fumed SiO$_2$ | 7 | PET with 3.5% TiO$_2$ and 1% MICABS ® A206 | 36 | PET with 0.12% synthetic and 0.15% fumed SiO$_2$ | 7 | white, shiny |
| 3 | PET with 0.12% synthetic and 0.15% fumed SiO$_2$ | 15 | PET with 3.5% TiO$_2$ and 5% MICABS ® A204 | 45 | PET with 0.12% synthetic and 0.15% fumed SiO$_2$ | 15 | white, shiny |
| 4 | PET with 0.12% synthetic and 0.15% fumed SiO$_2$ | 10 | PET with 3.5% TiO$_2$ and 7% MICABS ® A204 | 45 | PET with 0.12% synthetic and 0.15% fumed SiO$_2$ | 20 | white, shiny |
| 5 | PET with 0.12% synthetic SiO$_2$ | 15 | PET with 3.5% TiO$_2$ and 5% MICABS ® A206 | 45 | PET with 0.12% synthetic SiO$_2$ | 15 | white, shiny |

TABLE 1a-continued

Structure and Formulation of the Inventive Examples

| Example | First layer (A) Formulation | Thickness μm | Second layer (B) Formulation | Thickness μm | Third layer (A, A' or C) Formulation | Thickness μm | Appearance |
|---|---|---|---|---|---|---|---|
| 6 | PET with 0.6% coarse $SiO_2$ particles | 15 | PET with 3.5% $TiO_2$ and 5% MICABS ® A206 | 45 | PET with 0.12% synthetic $SiO_2$ | 15 | white, matt/shiny |
| 7 | PET with 0.12% synthetic and 2.1% colloidal $SiO_2$ | 15 | PET with 3.5% $TiO_2$ and 5% MICABS ® A206 | 45 | PET with 0.12% synthetic and 2.1% colloidal $SiO_2$ | 15 | white, shiny |
| 8 | PET with 0.12% synthetic $SiO_2$ | 15 | PET with 18% $BaSO_4$ and 5% MICABS ® A206 | 45 | PET with 0.12% synthetic $SiO_2$ | 15 | brilliant white, shiny |
| 9 | PET with 0.12% synthetic and 0.15% fumed $SiO_2$ | 25 | PET with 3.5% $TiO_2$ and 5% MICABS ® A204 | 45 | — | | white, shiny |

TABLE 1b

Structure and Formulation of the Comparative Examples

| Example | First layer (A) Formulation | Thickness μm | Second layer (B) Formulation | Thickness μm | Third layer (A) Formulation | Thickness μm | Appearance |
|---|---|---|---|---|---|---|---|
| C-1 | PET with 1% synthetic and 1.25% fumed $SiO_2$ | 15 | PET with 3.5% $TiO_2$ | 36 | PET with 1% synthetic and 1.25% fumed $SiO_2$ | 15 | white, shiny |
| C-2 | PET with 1% synthetic and 1.25% fumed $SiO_2$ | 15 | PET with 3.5% $TiO_2$ and 0.5% LAZERFLAIR ® 825 | 36 | PET with 1% synthetic and 1.25% fumed $SiO_2$ | 15 | white, shiny |
| C-3 | PET with 1% synthetic and 1.25% fumed $SiO_2$ | 15 | PET with 3.5% $TiO_2$ and 0.3% MARK-IT ® | 36 | PET with 1% synthetic and 1.25% fumed $SiO_2$ | 15 | white, shiny |
| C-4 | PET with 1% synthetic and 1.25% fumed $SiO_2$ | 15 | PET with 3.5% $TiO_2$ and 1.2% phosphorus-containing tin-copper mixed oxide | 36 | PET with 1% synthetic and 1.25% fumed $SiO_2$ | 15 | white, shiny |
| C-5 | PET with 1% synthetic and 1.25% fumed $SiO_2$ | 15 | PET with 5% MICABS ® A204 | 36 | PET with 1% synthetic and 1.25% fumed $SiO_2$ | 15 | translucent |
| C-6 | — | | PET with 3.5% $TiO_2$ and 5% MICABS ® A204 | 50 | — | | shiny |
| C-7 | PET with 1% synthetic and 1.25% fumed $SiO_2$ | 2 | PET with 18% $BaSO_4$ and 5% MICABS ® A206 | 71 | PET with 1% synthetic and 1.25% fumed $SiO_2$ | 2 | brilliant white, shiny |

TABLE 2

Properties of the Inventive Examples and Comparative Examples

| Example | Modulus of elasticity (GPa) longitudinal | transverse | σ-5 (MPa) longitudinal | transverse | Gloss 60° | Laser marking (VMc5 Nd: $YO_4$, 1064 nm) optimum kHz | P (%) | Marks color | surface | Comment |
|---|---|---|---|---|---|---|---|---|---|---|
| 1 | 4.3 | 5.4 | 106 | 98 | 105 | 40 | 50 | 3 | C | |
| 2 | 4.2 | 5.5 | 100 | 97 | 106 | 40 | 50 | 3 | C | |
| 3 | 4.2 | 5.4 | 101 | 97 | 106 | 50 | 50 | 4 | B | |
| 4 | 4.2 | 5.4 | 100 | 97 | 103 | 50 | 50 | 4 | B | side A, no holes at higher output |
| | | | | | 106 | 50 | 50 | 4 | B | side A', holes at higher output |
| 5 | 4.2 | 5.5 | 100 | 96 | 106 | 50 | 40 | 5 | A | |
| | | | | | | 30 | 60 | 4 | A | with VMc3 Nd: YAG laser |
| 6 | 4.1 | 5.5 | 101 | 96 | 45 | 50 | 40 | 5 | A | |
| 7 | 4.2 | 5.4 | 99 | 97 | 103 | 50 | 40 | 5 | A | |
| 8 | 4.1 | 5.9 | 92 | 92 | 104 | 50 | 40 | 5 | A | |
| | | | | | | 30 | 60 | 4 | A | with VMc3 Nd: YAG laser |

TABLE 2-continued

Properties of the Inventive Examples and Comparative Examples

| | Modulus of elasticity (GPa) | | σ-5 (MPa) | | Gloss | Laser marking (VMc5 Nd: YO$_4$, 1064 nm) | | | | |
|---|---|---|---|---|---|---|---|---|---|---|
| | | | | | | optimum | | Marks | | |
| Example | longitudinal | transverse | longitudinal | transverse | 60° | kHz | P (%) | color | surface | Comment |
| 9 | 4.1 | 5.4 | 95 | 96 | 108 | 50 | 40 | 5 | A | |
| 10 | 4.2 | 5.5 | 100 | 97 | 103 | 50 | 40 | 5 | A | written on the A side, D side melted at the same time |
| C-1 | 4.1 | 5.4 | | | 105 | 60 | 60 | 1 | B | gray-brown marking, best results up to 60 kHz, P = 60% |
| | | | | | | 70 | 60 | 1 | B | gray-brown marking, test up to P = 100%, slightly darker at 70 kHz |
| C-2 | 4.2 | 5.4 | | | 103 | 30 | 50 | 2 | D | burnt through or gray-brown at higher power and frequency |
| C-3 | 4.2 | 5.5 | | | 102 | 30 | 50 | 2 | D | as C-2 |
| C-4 | 4.2 | 5.5 | | | 99 | 30 | 50 | 2 | D | as C-2, but little browner |
| C-5 | 4.1 | 5.5 | | | 102 | 60 | 60 | 0 | A | very slight bubbles from 40 kHz and 40% P |
| C-6 | 4.3 | 5.4 | | | 86 | 40 | 50 | 2 | D | higher powers, not darker, but ablated and burnt through |
| C-7 | 4.2 | 5.5 | | | 103 | 40 | 50 | 2 | D | as C-6 |

The examples and comparative examples illustrate that only the combination of the essential parameters of the invention, i.e. the specific layer structure, the presence of a white pigment in the layer B and the use of a laser absorber which is coated with a carbonizing polymer leads to good laser markability in biaxially oriented polyester films. Comparative Example 1 shows that, without laser absorber, only dull markings in the polyester films are achievable without laser additive. Comparative Examples 2 to 4 show that, with laser additives without a carbonizing constituent, only moderately better marking results are achieved in polyester films. Comparative Example 5 shows that, without white pigment in the layer B, no marking at all is possible. Comparative Examples 6 and 7 show that, without an outer layer or with an excessively thin outer layer, it is not possible to achieve high-contrast markings in polyester films either. In contrast, the marking results in the inventive examples are good to excellent.

That which is claimed is:

1. A biaxially oriented at least two-layer coextruded film comprised of polyethylene terephthalate (PET) or polyethylene 2,6-naphthalate (PEN), said PET or PEN optionally including additional comonomer-derived units other than ethylene glycol and/or terephthalic acid or naphthalene-2,6-dicarboxylic acid, said film comprising a base layer and at least one exterior outer layer,
   wherein the base layer comprises a white pigment and a laser absorber which has been coated with a carbonizing polymer,
   the thickness of at least one of said exterior outer layer(s), which comprises no laser absorber, is at least 3 microns, and said film has a modulus of elasticity of greater than 3.5 GPa in the longitudinal and transverse directions as measured via DIN EN ISO 572-1 and -3.

2. The film as claimed in claim 1, wherein said film comprises at least three layers and the exterior outer layers comprise no laser absorber.

3. The film as claimed in claim 2, wherein the melting point of one exterior outer layer is lower than that of the laser-absorber-containing layer.

4. The film as claimed in claim 1, wherein said film comprises two layers.

5. The film as claimed in claim 1, wherein the carbonizing polymer has been chemically bonded to a compatibilizing polymer, and said compatibilizing polymer forms a shell around the laser absorber, with the laser absorber forming a core.

6. The film as claimed in claim 5, which comprises a further pseudoplastic polymer.

7. The film as claimed in claim 6, wherein the pseudoplastic polymer is a polyolefin.

8. The film as claimed in claim 5, wherein the diameter of the core of the laser absorber is from 10 nm to 10 μm.

9. The film as claimed in claim 5, wherein the compatibilizing polymer is selected from maleic-anhydride-modified polyethylene, polypropylene, and mixtures thereof.

10. The film as claimed in claim 1, wherein the carbonizing polymer is selected from polyamides, polyesters, polycarbonates and mixtures thereof.

11. The film as claimed in claim 1, said film having a total thickness of from 23 μm to 1 mm.

12. The film as claimed in claim 11, said film having a total thickness of 30 μm to 1 mm.

13. The film as claimed in claim 11, said film having a total thickness of from 40 to 700 μm.

14. The film as claimed in claim 11, said film having a total thickness of from 65 to 600 μm.

15. The film as claimed in claim 1, wherein the white pigment is barium sulfate and/or titanium dioxide.

16. The film as claimed in claim 1, wherein at least one of the outer layers comprises particles as slip additive.

17. The film as claimed in claim 1, wherein a coating comprising particles has been applied on at least one of the exterior outer layers.

18. The film as claimed in claim 1, wherein the thickness of at least one of the exterior outer layers, which comprises no laser absorber, is at least 5 μm.

19. The film as claimed in claim 1, wherein the thickness of at least one of the exterior outer layers, which comprises no laser absorber, is at least 7 μm.

20. The film as claimed in claim 1, wherein the thickness of at least one of the exterior outer layers, which comprises no laser absorber, is at least 12 μm.

21. The film as claimed in claim 1, wherein said film exhibits a mid gray to black colored mark upon marking with a Nd:YO$_4$ laser at 1064 nm.

22. The film as claimed in claim 1, wherein at least one of said outer layer(s), which comprises no laser absorber, has a thickness of 3 to 25 microns.

* * * * *